(No Model.)

E. DIMITY & W. F. GRIFFIN.
WEED CUTTER FOR LISTED CORN.

No. 464,819.                    Patented Dec. 8, 1891.

Witnesses
T. Scott Morrison
John A. Morrison

Inventors
Engelhard Dimity
William F. Griffin
By their Attorney
H.W. Stackpole

UNITED STATES PATENT OFFICE.

ENGELHARD DIMITY AND WILLIAM F. GRIFFIN, OF CLAY CENTRE, KANSAS.

WEED-CUTTER FOR LISTED CORN.

SPECIFICATION forming part of Letters Patent No. 464,819, dated December 8, 1891.

Application filed June 16, 1891. Serial No. 396,415. (No model.)

*To all whom it may concern:*

Be it known that we, ENGELHARD DIMITY and WILLIAM F. GRIFFIN, citizens of the United States, residing at Clay Centre, in the county of Clay and State of Kansas, have invented certain new and useful Improvements in Weed-Cutters for Listed Corn; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Our invention relates to improvements in weed-cutters for listed corn; and the objects are to provide an implement for cutting the weeds in a field of listed corn, which implement shall be readily and completely adjustable in every essential particular, and to so shape and adjust the knives that, while effectually cutting the weeds, they will at the same time stir and pulverize the soil. We attain these objects by means of the mechanism hereinafter described, and illustrated in the accompanying drawings, in which—

Figure 1:
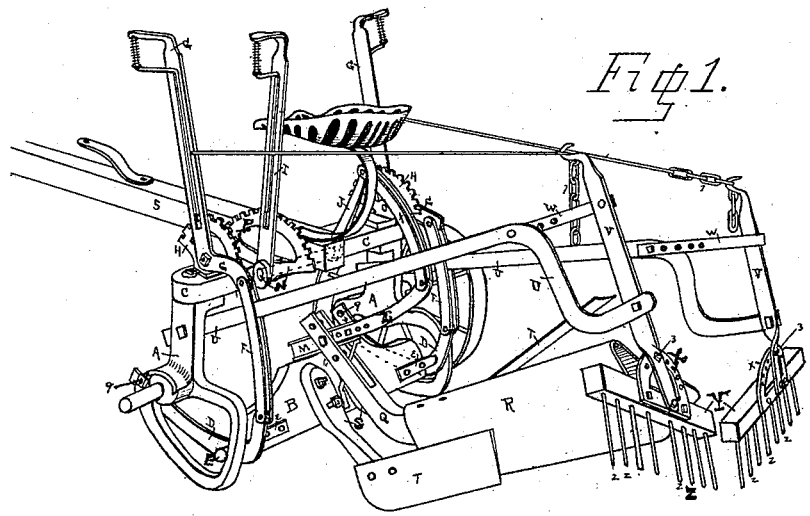
Figure 2:
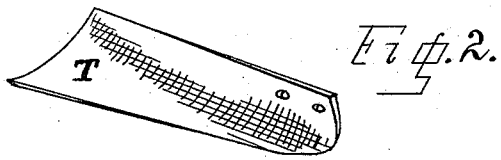

Figure 1 is a view in perspective of our invention complete, except that the near wheel is omitted; and Fig. 2, a view of our proposed knife.

Similar letters and figures refer to similar parts.

The cranks A are surmounted by cross-bar C, thus forming an arched axle, to which is attached pole 5. A rocking body or cross-head B is journaled at each end in arms D, pivoted by bolt 9 to the forward shoulder of said crank A, and arm D is loosely jointed to bent lever G by the connecting-rod F. To rocking body or cross-head B are secured shanks or brackets S, to which are attached knives T. Said knives are concaved, with a twist from forward point to rear heel, thus causing the soil to roll and fall from such heel in a more broken and pulverized state than with the ordinary straight knife, also disturbing the weeds and, with the assistance of the rakes Y, exposing them more completely to the action of the sun. The journals E of the cross-head B by passing beyond and bearing against the face of the rear portion of crank A serve to lessen the strain upon the arm D. To raise or lower cross-head B, levers G are released from their engagement with ratchets H and moved in the desired direction.

To the edge of the cross-head B is secured lug M, rigidly attached to extension L, which is loosely jointed to crank-lever J by connecting-rod K. The horizontal shaft N of said lever is shown by dotted lines and operated by handle I, secured thereto. By freeing said handle from its engagement with ratchet P cross-head B may be rocked on its journals E so as to change the plane of knives T or raise them clear of the ground. Said knives may also be adjusted laterally by means of the slots shown in shanks S. Fender R is attached to said lug M by means of perforated standard Q. Rakes Y, having teeth Z, perforated arches X, and standards V, are pivoted to arms U, which are in turn pivoted to the cranks A, that form the vertical portions of the arched axle. Said standards V are held in their vertical position by means of perforated bars W, also secured to arms U. The upper ends of said standards, being connected by rods 1 with lever-handles G, not only regulate the depth of said rakes in the soil, but cause them to be raised or lowered with knives T. The lateral plane of said rakes may be regulated by means of said perforated arches X and bolts 3 so as to conform to the general incline of the furrows, thus stirring the soil to an even depth and leaving it free of weeds, which might without said rakes be merely disturbed and many of the weeds left, as in the old way, to grow even more freely than before. The vertical plane of the teeth Z, it will be readily seen, is regulated by means of the perforated bars W.

We would have it understood that we do not herein claim the combination, with an adjustable rocking cross-head and its attached knives, of a lever for varying the inclination of said cross-head and knives and levers for raising and lowering the same; neither do we claim the combination, with a frame and slotted crank-arms, of a rocking cross-head having knives adjustably secured thereto and means for rocking said cross-head and adjusting the knives, as such features are shown, described, and claimed in an application, Serial No. 389,865, filed by Engelhard Dimity April 21, 1891.

Having thus described our invention, what we claim as new, and desire to secure by Letters Patent, is—

1. In a weed-cutter, the combination of an arched axle having the cranks A, the arms D, pivoted to said cranks, the rocking cross-head B, journaled in said arms and provided with the lug M and knives T, the lifting-levers G, the connecting-rods F, the horizontal shaft N, the adjusting-lever I, mounted on one end of said shaft, the crank-lever J on the other end of said shaft, and the connecting-rod K and extension L for connecting said crank-lever J with the lug M, substantially as described.

2. In a weed-cutter, the combination of an arched axle having the cranks A, the arms D, pivoted to said cranks, the rocking cross-head B, journaled in said arms and provided with knives T, the lifting-levers G, connected with the arms D, the adjusting-lever I, connected with the rocking cross-head B, the bent arms U, pivoted to the cranks A, the rakes Y, having arches X and adjustable standards V, connected with the rear portions of the bent arms U, and the rods 1, connecting said standards with the levers G, substantially as described.

3. In a weed-cutter, the combination of an arched axle having cranks A, the rearwardly-extended arms D and U, pivoted to said cranks, the rocking cross-head B, journaled in the arms D and provided with knives T, the rakes Y, having adjustable standards V, connected with the rear portions of the arms U, and means for adjusting said rakes and knife-carrying cross-head, substantially as described.

4. In a weed-cutter, the combination, with a rocking cross-head, of a concaved knife having a twist from its front point rearward to its heel, substantially as described.

5. In a weed-cutter, the combination of an arched axle having cranks at its ends, rearward-extended arms pivoted to said cranks, a rocking cross-head journaled in said arms and having its journals bearing against the rear portions of the cranks, concaved twisted knives carried by the cross-head, adjustable rakes supported in rear of the cross-head, and means for adjusting said rakes and cross-head, substantially as described.

In testimony whereof we affix our signatures in presence of two witnesses.

ENGELHARD DIMITY.
WILLIAM F. GRIFFIN.

Witnesses:
JOHN A. MORRISON,
ALFRED BENOIT.